United States Patent
Vasquez et al.

(10) Patent No.: US 6,691,202 B2
(45) Date of Patent: Feb. 10, 2004

(54) ETHERNET CROSS POINT SWITCH WITH REDUCED CONNECTIONS BY USING COLUMN CONTROL BUSES

(75) Inventors: Silverio C. Vasquez, Westminster, CO (US); Jaan Raamot, Broomfield, CO (US)

(73) Assignee: Lucent Technologies Inc., Murray Hill, NJ (US)

( * ) Notice: Subject to any disclaimer, the term of this patent is extended or adjusted under 35 U.S.C. 154(b) by 488 days.

(21) Appl. No.: 09/748,565

(22) Filed: Dec. 22, 2000

(65) Prior Publication Data

US 2002/0083261 A1 Jun. 27, 2002

(51) Int. Cl.⁷ .................. G06F 13/40; G06F 15/173; H04Q 1/00
(52) U.S. Cl. .................. 710/316; 340/2.2; 370/364; 370/908
(58) Field of Search .................. 710/316, 100, 710/305; 340/2.28, 2.2; 709/249, 218, 200, 250, 220; 370/351, 386, 397, 400, 908, 364

(56) References Cited

U.S. PATENT DOCUMENTS

| | | | | |
|---|---|---|---|---|
| 4,725,835 A | * | 2/1988 | Schreiner et al. | |
| 5,144,622 A | * | 9/1992 | Takiyasu et al. | |
| 5,784,003 A | * | 7/1998 | Dahlgren | |
| 5,818,842 A | * | 10/1998 | Burwell et al. | |
| 6,259,699 B1 | * | 7/2001 | Opalka et al. | |
| 6,418,481 B1 | * | 7/2002 | Mancusi et al. | |

OTHER PUBLICATIONS

"High speed IP switching over the EtherSwitch" by Jiun–Ji Liu and Chen, W.–S.E. (abstract only).*
"EtherReal: a host–transparent real–time Fast Ether switch" by Varadarajan, S. and Chiueh, T (abstract only).*

\* cited by examiner

*Primary Examiner*—Gopal C. Ray

(57) ABSTRACT

A method for communicating from a source port (i) to a destination port (j) is employed within a switching system that has m ports, each of the ports being coupled to a local area network via a Hub. The connectivity between the inputs and outputs of the m ports forms a matrix of cross points having m rows and m columns. Each port has a transmit line coupled to a row of the matrix and a receive line coupled to a column of the matrix. A transmission operation from the source port (i) to the destination port (j) involves a first control circuit for unilaterally connecting the port (i) to the port (j), a second control circuit for unilaterally connecting the port (j) to the port (i). The method includes the use of a third control circuit, and a column control bus that couples the third control circuit to a plurality of control circuits including the second control circuit.

23 Claims, 11 Drawing Sheets

ETHERNET CROSS POINT SWITCH WITH REDUCED CONNECTIONS BY USING COLUMN CONTROL BUSES

CROSS REFERENCE TO RELATED APPLICATION

Reference is hereby made to U.S. patent application Ser. No. 09/203,016, filed on even date herewith, now U.S. Pat. No. 6,353,858 issued Mar. 5. 2002.

FIELD OF THE INVENTION

The present invention relates generally to a system and method for providing connectivity between networks, and more particularly, to a system and method for providing connectivity with collision detection in large-scale networks.

BACKGROUND OF THE INVENTION

Data networks, in general, use multiple layers of communication protocols to effectuate data communication between entities on the network. The lowest layer of the communication is often referred to as the physical layer. The second layer is often referred to as the packet layer. Communication standards that include such multiple layer connectivity include that defined in the ISO 8802/3IEEE 802.3 specification for 10Base-T local area networks.

In accordance with such communication schemes, lower layers are generally employed for local switching between the network entities connected to a single hub. In general, physical layer switches are geographically limited in part because of the methodologies employed to detect whether connectivity is available. According to the ISO standards, a source entity determines physical layer connectivity by sending a packet to the hub, the packet being intended for a destination entity. When the hub receives a transmit packet, it repeats the packet to all entities that are connected to the hub. If another network entity has transmitted a packet to the hub before the packet from the source hub is completely received by the hub, the source entity detects a collision and then determines that the transmission is unsuccessful. If however, no collision is detected, the hub provides the connection to the destination entity and passes the transmitted packet directly through.

Packet layer switching, which typically occurs between hubs of a larger network, includes the step of sending one or more packets to a packet switch from a source entity. The packet switch then stores one or more packets and transmits the packets when connectivity to the destination entity or another intermediate switch is available. By contrast, in physical layer switching, as discussed above, the collision is made in real-time as the source entity packet is being transmitted.

Accordingly, physical layer switching allows for faster communication than packet layer switching because physical layer switching does not involve the storage of packets in the intermediate switch. However, packet layer switching is usually employed to establish connectivity between multiple local area networks ("LANs"). Thus, communication between entities on multiple local area networks is relatively slow as compared to communication between entities on the same local area network.

A switching system has been proposed, however, that allows multiple LANs to be connected at physical layer, thus providing increased communication speed. The switching system is described in U.S. patent application Ser. No. 09/203,016, filed Nov. 30, 1998, now U.S. Pat. No. 6,353,858 issued March 5, 2002. which is assigned to the assignee of the present invention and incorporated herein by reference. The system includes a space switching unit and a plurality of switch interface units coupled between the space switching unit and a plurality of LANs. When a LAN provides a transmit packet to its switch interface unit, the switch interface unit establishes a first unilateral path from the destination entity to the space interface unit that is coupled to the source entity. If the space interface unit detects activity on the first unilateral path, the space interface unit provides a collision indication to the source entity before the source entity has finished transmitting the transmit packet. Because the collision is provided before the source has finished transmitting the packet, the source entity logs a collision as it would in any LAN collision.

If, however, the switch interface unit detects no activity on the first unilateral path, the switch interface unit establishes a second unilateral path from the source entity to the destination entity to allow communications. A first-in-first-out buffer or the like delays the transmit packet a sufficient amount of time to allow the collision determination to be made.

Thus, the entire connection operation described in the U.S. patent application Ser. No. 09/203,016 now U.S. Pat. No. 6,353,858 issued Mar. 5. 2002. is provided within the standard communication requirements of a physical layer switching operation. As a result, connectivity between multiple entities on multiple LANs may be accomplished relatively quickly.

While the forgoing switching system can increase transmission speed between LANs, it is limited by the practical number of connections that the space switching unit may make. The space switching unit typically is an integrated circuit that allows each of m inputs to be connected to each of m outputs. Currently, such a device allows for first and second unilateral connections (i.e. transmit and receive links) between 128 entities. Each of the links is independently addressed through corresponding m single input address lines. Although such a device may be expanded to provide 256 or more connections, the number of connections remains limited to the capacity of the space switching unit.

Consequently, there is a potential need for expand physical layer switching capacities in a switching system between multiple LANs (or other sub-networks).

SUMMARY OF THE INVENTION

The present invention fulfills the above need(s), as well as others, by providing a switching arrangement that allows for physical layer switching between large numbers of Hubs. To this end, the switching arrangement includes a cross point matrix having a plurality of column control busses that interconnect the control circuitry of one or more columns of cross points. The column control busses eliminate the need for individual address control connections from each source port to each possible destination port cross point. As a result, large numbers of cross points are possible. Moreover, because each port need not be connected to the control circuitry each cross point, multiple cross point integrated circuits may be combined to increase switching capacity.

An exemplary embodiment of the present invention includes a method for communicating from a source port (i) to a destination port (j). The method is used with a switching system that has m ports, each of the ports being coupled to a local area network via a Hub. The connectivity between the inputs and outputs of the m ports forms a matrix of cross points having m rows and m columns. Each port has a transmit line being coupled to a row of the matrix and a receive line being coupled to a column of the matrix. A transmission operation from the source port (i) to the destination port (j) involves a first control circuit for unilaterally connecting the port (i) to the port (j) and a second control circuit for unilaterally connecting the port (j) to the port (i) (where i or j=1, 2, . . . , m).

The method comprises a first step of sending address information from the port (i) to a third control circuit. The method also includes the step of providing a column control bus that couples the third control circuit to a plurality of control circuits including the second control circuit, each of the plurality of control circuits operable to control the operation of a cross point. Then the address information is routed from the third control circuit to all of the plurality of control circuits including the second control circuit through the column control bus. The method further includes the step of making a unilateral path connection at a return path cross point from the destination port (j) to the source port (i) responsive to receiving the address information at the second control circuit.

The return path cross point allows monitoring the destination hub to determine if it is idle. Such monitoring is necessary to carry out physical layer switching. In particular, if the hub is not idle, a message may be sent to the source hub before the source hub completes transmission of the packet.

The present invention also provides a corresponding apparatus to perform the steps in the above-described method.

The above-described features and advantages, as well as others, will become more readily apparent to those of ordinary skill in the art by reference to the following detailed description and accompanying drawings.

DETAILED DESCRIPTION

Figure 1:
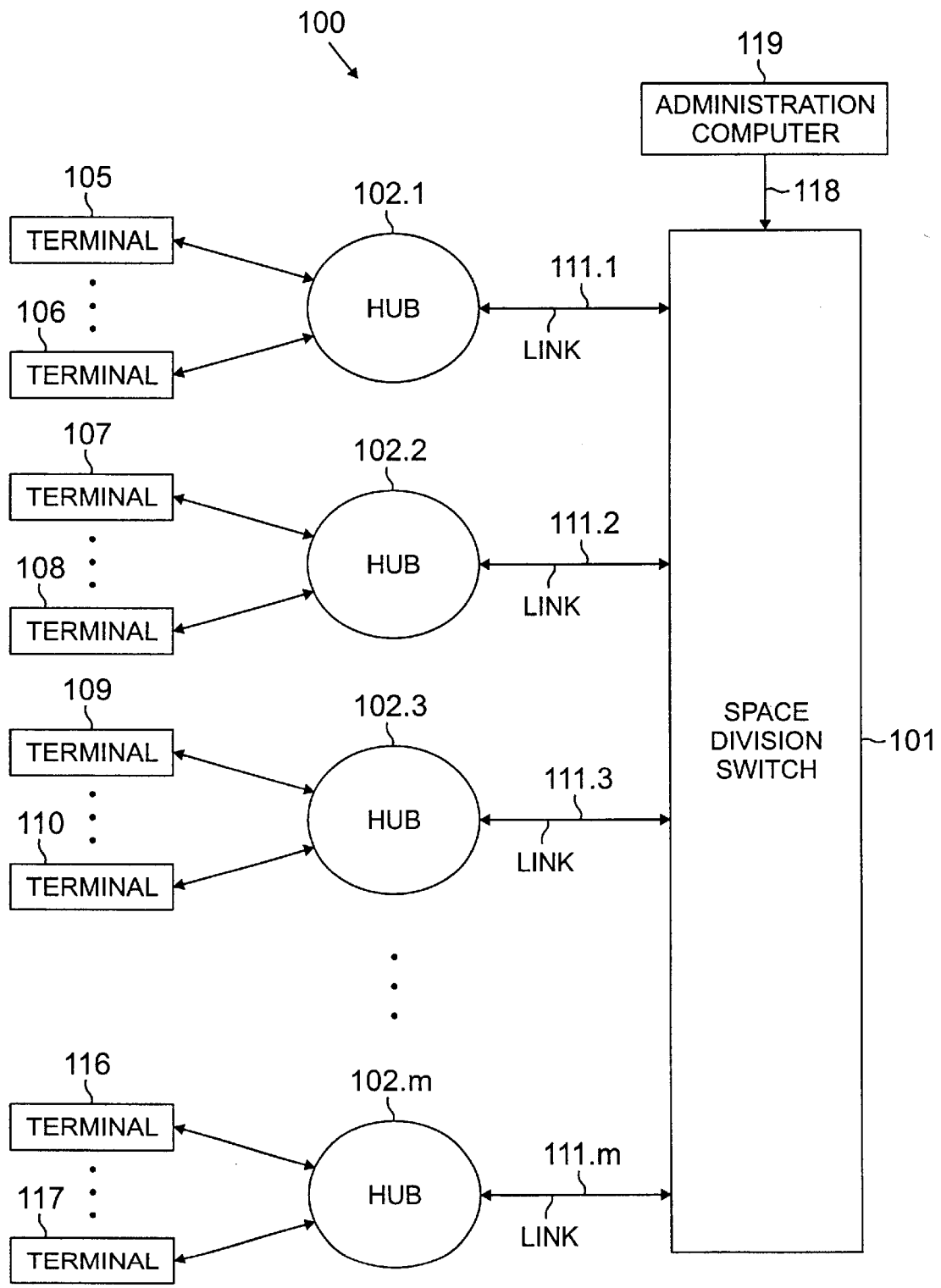
FIG. 1 shows an exemplary Ethernet switching system, in accordance with the present invention.

Referring to FIG. 1, there is shown an exemplary Ethernet switching system 100, in accordance with the present invention. The Ethernet switching system 100 includes a space division switch 101, a plurality of hubs 102.1, 102.2, 102.3., and 102.m, a plurality of terminals 105–110, 116 and 117, and an administration computer 119. Each of the Hubs 102.1, 102.2, 102.3, . . . , or 102.m is coupled to the space division switch 101 via a respective link 111.1, 111.2, 112.3, . . . , or 111.m. Each of the terminals is coupled to one of the Hubs.

Each of the Hubs 102.1, 102.2, 102.3, . . . , or 102.m is capable of functioning as a stand alone unit. For example, if the terminal 105 wishes to transmit a packet as illustrated in FIG. 3 to the terminal 106, this communication is done solely within the Hub 102.1. Each of the links 111.1, 111.2, 111.3, . . . , or 111.m comprises a transmit sublink and receive sublink as will be illustrated in greater detail in FIG. 2.

Figure 3:
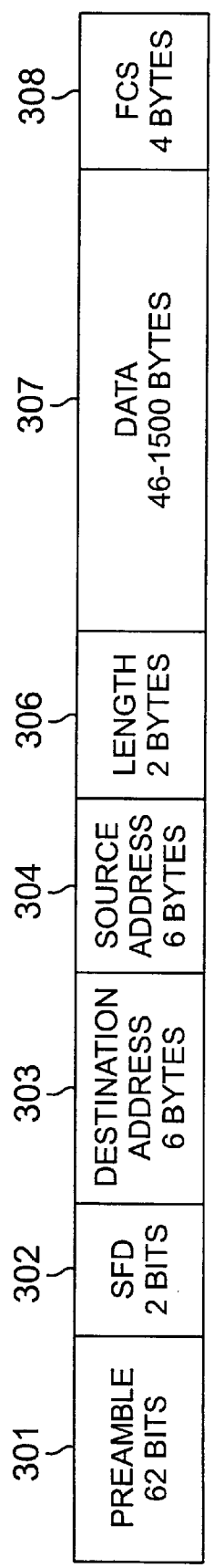
FIG. 3 shows a typical protocol of an Ethernet packet.
Figure 4:
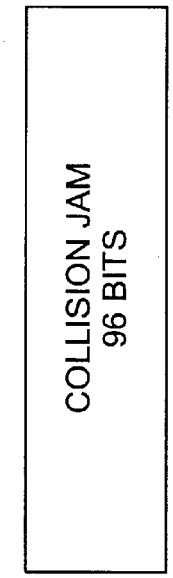
FIG. 4 shows a typical protocol of a collision jam packet.

In the example in which the terminal 105 transmits a packet to the terminal 106, if a collision occurs in the transmission process, then a jam signal as illustrated in FIG. 4 is transmitted to ensure that all terminals coupled to the Hub 102.1 recognize that a collision has occurred. For example, if the terminal 105 was attempting to transmit a packet to the terminal 106 and another terminal was transmitting a packet at the same time on the Hub 102.1, then the terminal 105 detects a violation of the packet protocol (illustrated in FIG. 3). Upon detecting the violation (or collision), the terminal 105 generates a jam signal as illustrated in FIG. 4 and attempts to transmit the packet at a later point in time to the terminal 106. During the transmission of a packet from the terminal 105 to the terminal 106, no connection is made from the Hub 102.1 to any other Hubs through the space division switch 101.

If the terminal 105 wishes to transmit a packet to the terminal 109 which is coupled to the Hub 102.3, the terminal 105 transmits the packet to the Hub 102.1. In general, the space division switch 101 monitors the link 111.1 for destination addresses in packets that do not correspond to a terminal coupled to the Hub 102.1. When the space division switch 101 recognizes the destination address as designating the terminal 109, the space division switch 101 monitors for the activity on the Hub 102.3. If a packet is presently being transmitted on the Hub 102.3, then the space division switch 101 does not allow the transmission of the packet from the terminal 105 to the terminal 109. In such a case, the space division switch 101 signals collision to the terminal 105.

In particular, the space division switch 101, upon recognizing the destination address as being that of the terminal 109, establishes a unilateral path from the Hub 102.3 to the Hub 102.1 via the link 111.3 and the link 111.1. Because another terminal is transmitting a packet on the Hub 102.3 and this packet is also being transmitted via the unilateral path, the space division switch 101 provides a collision signal to the terminal 105 via the Hub 102.1. The transmission of the packet on the Hub 102.3 is not interfered with since no transmission path was setup from the Hub 102.1 to the Hub 102.3.

To further the previous example, assume that the terminals 105 and 107 simultaneously attempt to transmit a packet to the terminal 109. The space division switch 101 establishes a first unilateral path from the Hub 102.3 to the Hub 102.1 and a second unilateral path from the Hub 102.3 to the Hub 102.2. If it is also assumed that the terminal 110 is transmitting a packet on the Hub 102.3, then the space division switch 101 does not allow the Hubs 102.1 and 102.2 to transmit the packets from their respective transmitting terminals to the Hub 102.3. The terminals 105 and 107 will both detect collision signals generated by the space division switch 101 and attempt to transmit at a later point in time.

Assume, however, that the terminal 110 was not transmitting a packet, and the Hub 102.3 was idle when the terminals 105 and 107 both simultaneously started to transmit a packet to the terminal 109. Both packets are allowed to be transmitted via the space division switch 101 to the terminal 109 through the Hub 102.3. However, the space division switch 101 detects a collision and generate a jam signal as illustrated in FIG. 4.

The space division switch 101 is non-blocking. This allows two terminals, each being coupled to a different Hub, to be simultaneously transmitting via the space division switch 101 to two destination terminals each being coupled to other Hubs. For example, the terminal 105 can be transmitting to the terminal 110 simultaneously with the transmission of the terminal 108 to the terminal 116. In addition, a terminal can transmit to all other terminals utilizing the broadcast capabilities of the space division switch 101.

Figure 2:
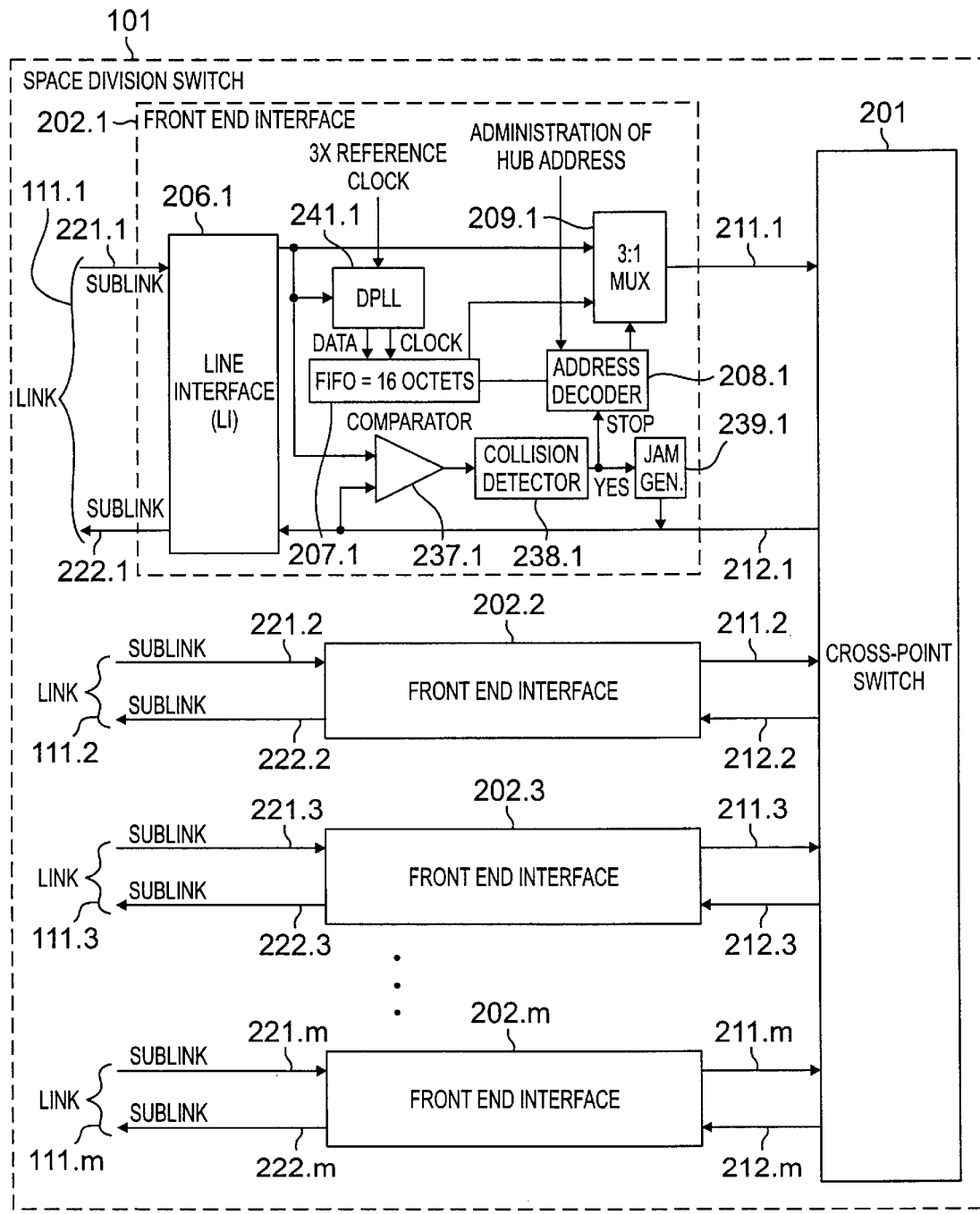
FIG. 2 shows the space division switch illustrated in FIG. 1 in further detail, in accordance with the present invention.

Referring to FIG. 2, there is shown the space division switch 101 illustrated in FIG. 1 in further detail, in accordance with the present invention. The space division switch 101 comprises a cross-point switch 201 and m front end interfaces 202.1, 202.2, 202.3, . . . , and 202.m that are coupled to the cross-point switch 201. Each of the links 111.1, 111.2, . . . , or 111.m comprises a pair of sublinks, one being a transmit sublink 221.1, 221.2, . . . , or 221.m and other being a receive sublink 222.1, 222.2, . . . , or 222.m. Each of the sublink pairs is coupled to a respective front end interface 202.1, 202.2, . . . , or 202.m. For each Hub x, the transmit sublink 221.x is utilized to transmit data from a Hub 102.x to the space division switch 101, and the receive sublink 222.x is utilized to receive data from the space division switch 101 to a Hub 102.x. The cross-point switch 201 receives m inputs (i.e. m port inputs) and switches the m inputs to m outputs (i.e. m port outputs). The m port inputs to the cross-point switch 201 are port transmit links 211.1, 211.2, . . . , and 211.m. The m port outputs from the cross-point switch 201 are port receive links 212.1, 212.2, . . . , and 212.m.

FIG. 2 shows the front end interface 202.1 in detail, which includes a line interface (LI) 206.1, a digital phase lock loop (DPLL) 241.1, a first-in-first-out buffer (FIFO) 207.1, an address decoder 208.1, a multiplexer (mux) 209.1, a comparator 237.1, a collision detector 238.1, and a jam generator 239.1.

Consider the previous example where the terminal 105 is transmitting to the terminal 109 but there is activity on the Hub 102.3. All packets transmitted on the Hub 102.1 are communicated to the line interface (LI) 206.1 via the sublink 221.1. The information received by the line interface (LI) 206.1 is transmitted to the mux 209.1 and digital phase lock loop (DPLL) 241.1. The DPLL 241.1 recovers the clock and data from the information received from the line interface (LI) 206.1 and transmits the clock and data to the FIFO 207.1.

As will be discussed further below, the mux 209.1 has three modes of operation corresponding to its three inputs. In one mode of operation, the default mode, the mux 209.1 selects the input being directly received from the line interface 206.1. This mode allows other front end interfaces 202.x to monitor traffic on the hub 102.1 as necessary to determine whether the hub 102.1 is idle. In a second mode of operation, the mux 209.1 selects the input from the address decoder 208.1 to transmit address and control information to the cross point switch 201 for use by the control circuits located therein. In the third mode of operation, the mux 209.1 selects the input from the FIFO 207.1 to transmit a packet from the hub 102.1 to a destination hub via the cross point switch.

In general, in the first mode of operation the mux 209.1 remains in its default mode receives input from the line interface (LI) 206.1. In the default state, the FIFO 207.1 also receives the data from the line interface 206.1 so that the data can be monitored for incoming packets. The FIFO 207.1 has a capacity of 16 bytes so that it can delay the transmit packet a sufficient amount of time to allow the collision determination to be made. As can be seen from FIG. 3, the FIFO 207.1 can buffer the fields 301 to 303 (for a total of fourteen bytes) plus the first and second byte of the field 304 (source address field). The first and second byte of the source address field 304 are not processed, but merely providing a timing delay to allow the collision determination to be made. The address decoder 208.1 monitors the destination address of every packet as it is buffered in the FIFO 207.1 to determine whether the packet is destined for another Hub other than the Hub 102.1. To this end, the address decoder 208.1 receives address information via the link 118.1 from the administration computer 119. The address decoder 208.1 stores the address information in a table so that it may be used when needed.

When the address decoder 208.1 determines that the destination address field from an incoming packet designates that the packet is going to the terminal 109 via the Hub 102.3, the address decoder 208.1 signals the collision detector 238.1. The address decoder 208.1 then transmits an address and control information via the mux 209.1 and the link 211.1 (or port (1) input) to the cross point switch 201 to establish a unilateral (reverse) path from the Hub 102.3. To this end, the mux 209.1 operates in its second mode. The mux 209.1 in its second mode transmits the address and control information in a manner that is distinguishable from ordinary Ethernet data. In the example, described herein, the mux 209.1 transmits address and control information to the cross point switch 201 using a higher voltage bias level. As a result, the control circuitry within the cross point switch 201 can distinguish local address and control information (upon which it may act) from Ethernet data to be transmitted (which it should ignore).

In any event, the cross point switch 201 establishes the reverse unilateral path. The unilateral path includes the sublink 221.3, front end interface 202.3, link 211.3, cross point switch 201 and link 212.1. The collision detector 238.1, using the comparator 237.1, monitors this unilateral path to determine whether the Hub 102.3 is idle. Details regarding the operations of the cross point switch 201 that establish the unilateral path from the Hub 102.3 are provided below in connection with FIGS. 6, 7, 8 and 9.

If the Hub 102.3 is idle, then the collision detector 238.1 enables the mux 209.1 so that the output of the FIFO 207.1 can be transmitted via the link 211.1, cross-point switch 201, link 212.3, and link 222.3 to the Hub 102.3. To this end, upon detecting that there is no activity in the Hub 102.3, the address decoder 208.1 establishes via the mux 209.1 a unilateral (forward) path via the cross-point switch 201 to allow the transmission of data from the link 211.1 to the link 212.3. To transmit the packet, the mux 209.1 reduces its output voltage level and transmits the packet data from the FIFO 207.1 over the link 211.1. Details regarding the operations of the cross point switch 201 that establish the unilateral path to the Hub 102.3 are provided below in connection with FIGS. 6, 7, 8 and 9.

If, however, the Hub 102.3 is not idle when the terminal 105 attempts to transmit a packet to it, the collision detector 238.1 detects the non-idle condition and does not establish the path from the link 211.1 to the link 212.3 via the cross-point switch 201. The collision detector 238.1 also activates the jam generator 239.1 so that the terminal 105 can detect a collision. Then, the collision detector 238.1, using the address decoder 208.1, causes the cross point switch 201 to drop the link 211.3 to the link 212.1 connection. (See FIGS. 6, 7, 8 and 9).

During the transmission of a packet from the terminal 105 to the terminal 109, the terminal 110 may also commence transmitting a packet. In this situation, the terminals 105 and 110 detect a collision and transmit the jam signal as illustrated in FIG. 4 to the Hub 102.3. The terminals 105 and 110 recognize the collision and will attempt transmission of the packet at a later point in time.

The Hubs 102.2, . . . , and 102.m are coupled to the cross-point switch 201 through the front end interfaces 202.2, . . . , and 202.m, respectively. The structure and function of the front end interfaces 202.2, . . . , or 202.m are the same as that of the front end interface 202.1.

Referring to FIG. 3, there is shown an Ethernet packet 300, which includes a preamble field 301, an start frame delimiter ("SFD") field 302, a destination address field 303, a source address field 304, a length field 306, a data field 307 and an frame check sum ("FCS") field 308. Referring to FIG. 4, there is shown a collision jam signal (or jam packet) having a unique bit pattern for indicating collision conditions during Ethernet packet transmissions.

Figure 5:
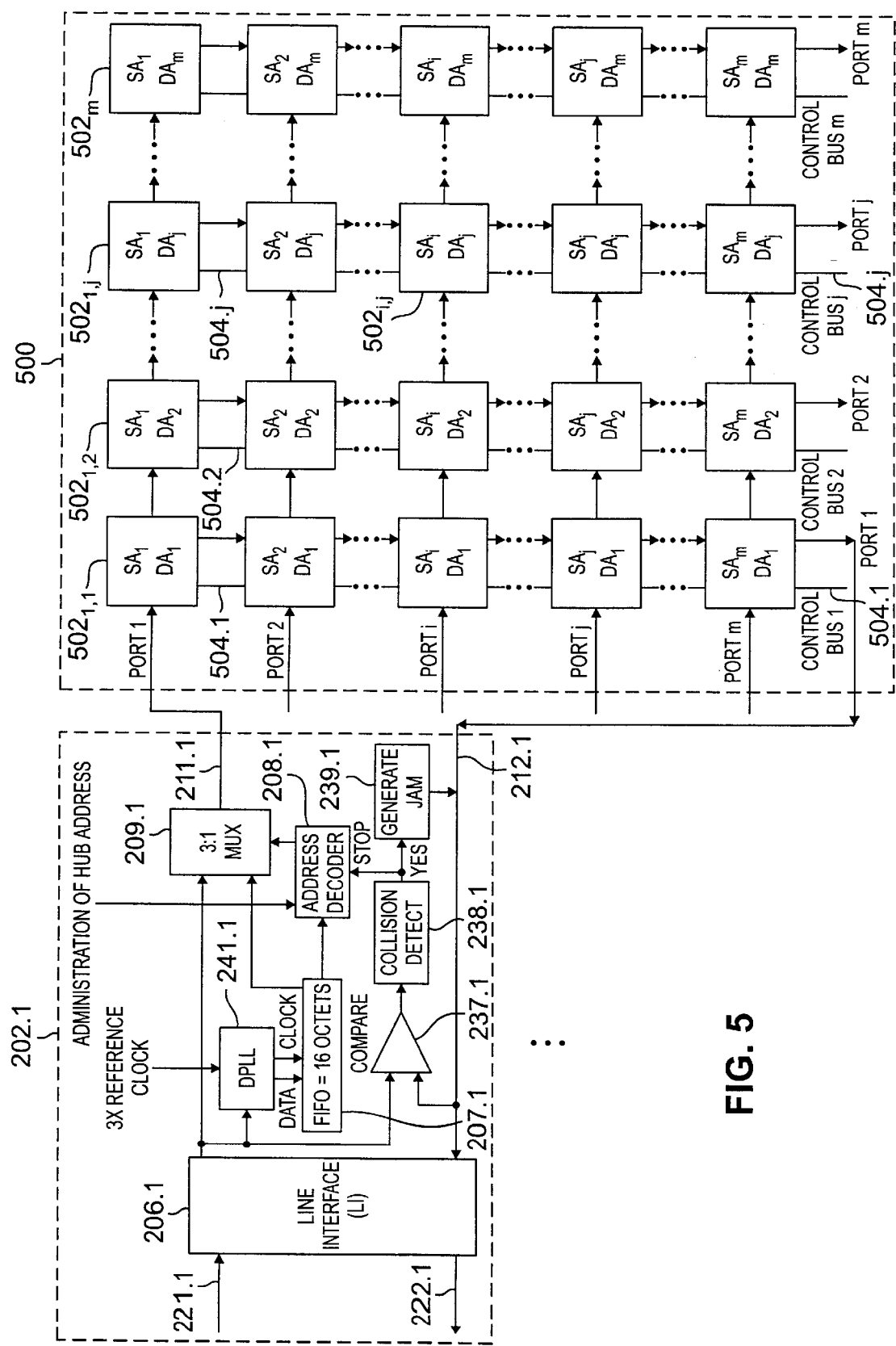
FIG. 5 shows the cross point switch illustrated in FIG. 2 in further detail, in accordance with one embodiment of the present invention.

Referring to FIG. 5, there is shown the cross-point switch 201 illustrated in FIG. 2 in further detail, in accordance with one embodiment of the present invention. The cross-point switch 201 receives m inputs (m port inputs) and connects the m inputs to m outputs (m port outputs). The connectivity between the m inputs and m outputs forms a cross point matrix 500 having m×m cross points consisting of m rows and m columns. The cross point matrix 500 may suitably be formulated as a single application specific integrated circuit (ASIC), but may also consist of discrete circuitry.

Each cross point $502_{i,j}$ (i or j=1, 2, . . . , m) denotes that the cross point is able to establish a unilateral path from port (i) to port (j). The cross points $502_{i,j}$ are also labeled with a SAi and a DAj designation. The SAi represents a local source address for port (i), and the DAj represents a local destination address for a port (j). The transmit line for each port (i) (i=1, 2, . . . , m) is coupled to all cross points $502_{i,j}$ for j=1, 2, . . . , m in the ith row of the matrix 500. Likewise, the receive line of each port (j) is coupled to all cross points $502_{i,j}$ for i=1, 2, . . . , m in the jth column of the matrix 500.

Within a column j, all cross points $502_{i,j}$ for i=1, 2, . . . , m are coupled to a column control bus $504_j$. Any cross points $502_{i,j}$ in the jth column can gain access to the address information that is sent to any cross points in that column.

As illustrated in FIG. 2, each of m front end interfaces is coupled to the cross-point switch 201. FIG. 5 shows the connection detail between the front end interface 202.1 and the cross point matrix 500. Specifically, the link 211.1 from the mux 209.1 is. coupled to port (1) input, which is further coupled to all cross points in the first row of the cross point matrix 500. The link 212.1 to the line interface (LI) 206.1 is coupled to the port (1) output.

By the same token, all other front end interfaces are coupled to the cross point matrix in the same way as that of the front end interface 202.1. Specifically, the link 211.i from the mux 209.i is coupled to port (i) input, which is further coupled to all cross points in the ith row of the cross point matrix 500; the link 212.i to the line interface (LI) 206.i is coupled to the port (i) output (i=2, 3, . . . , m).

Using the cross point switch 201 illustrated in FIG. 5, the operation for connecting a source port (i) to a destination port (j), where i=1, is described as follows:

1. The front end interface 202.1 (for Port 1) receives a packet and decodes a local destination address (i.e. the DAj for port (j)). The port 1 local source address is built in.
2. The front end interface 202.1 transmits the local destination address (i.e. port DAj in the matrix) and its own local source address (i.e. port SAi in the matrix) to all cross points $502_{i,j}$ for j=1, 2, . . . , m in the ith (or $1^{st}$) row.
3. Cross point control circuitry within the ith row and the ith column, i.e. the control circuit at the cross point $502_{1,1}$ obtains the address information and then transmits the information along its associated column control bus $504_i$ (e.g. $504_1$). To this end, the column control bus uses the Datakit arbitration scheme. That is, the bus is wired-or connected at the cross point control circuits. In particular, the cross point control circuit which sends data on the bus also reads the data from the bus. If the data matches, the transmission is successful; otherwise it re-sends the address on the next bus cycle.
4. All of the m cross points $502_{d,1}$ in the first column monitor the destination address on the bus $504_1$ to see if the destination address matches its source address. The cross point that matches captures the source address on the bus to make a DA to SA cross point unilateral connection from port (j) to port 1. Thus, in this example, the cross point $502_{j,1}$ establishes the unilateral connection from the destination port (j) to the source port 1.
5. Using the unilateral connection from port (j) to port 1, the collision detector 238.1 of the front end interface 202.1 detects whether there is any activity of the Hub (j) (which is coupled to the port (j)).
6. If the Hub (j) is not idle, a collision is detected. However, if the Hub (j) is idle, then an SA to DA cross point unilateral connection from port 1 to port (j) is established. In this example, the cross point $502_{1,j}$ is the circuit that establishes the unilateral connection from port 1 to port (j).

Figure 6:
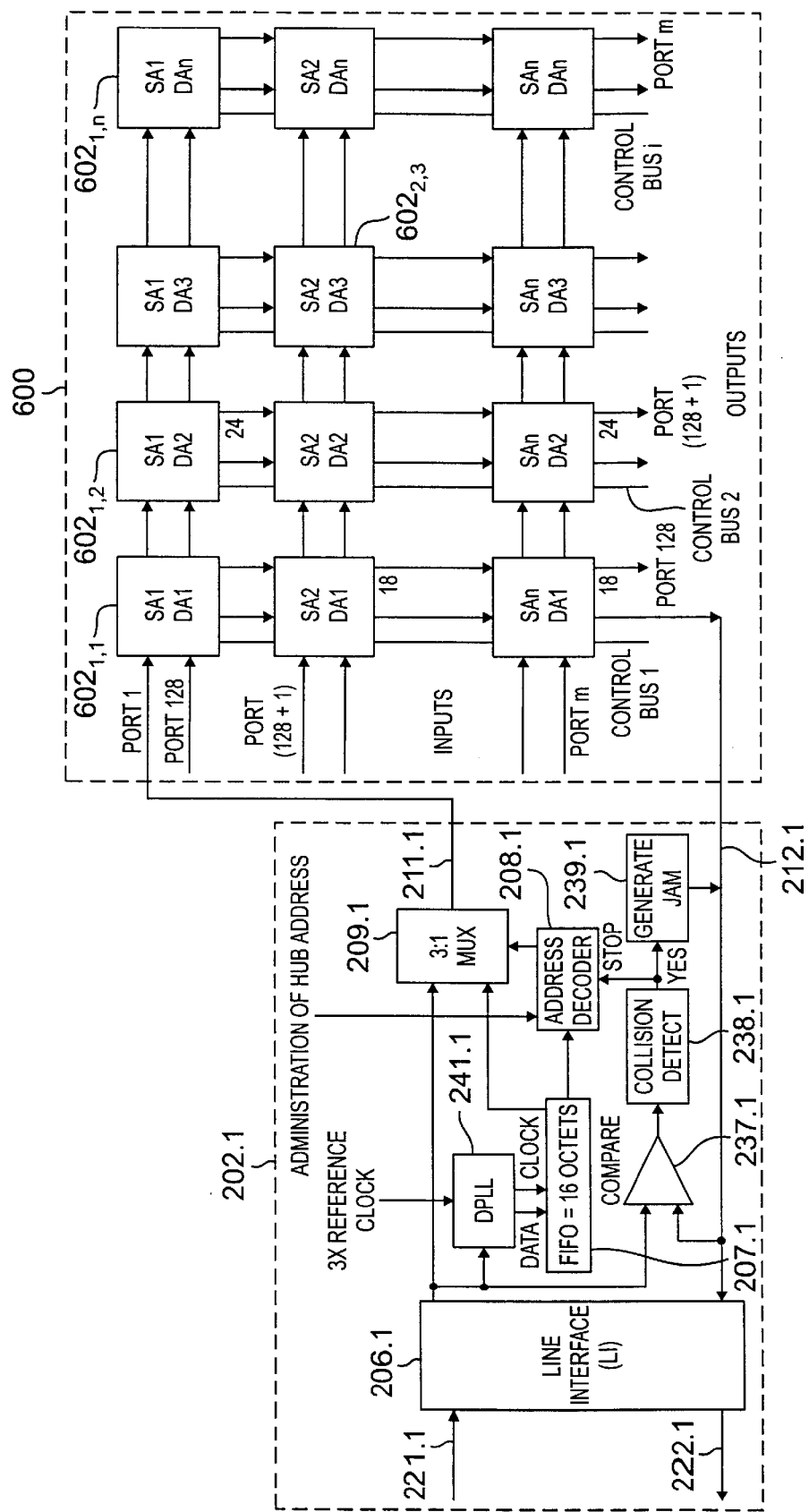
FIG. 6 shows the cross point switch illustrated in FIG. 2 in further detail, in accordance with another embodiment of the present invention.

Referring to FIG. 6, there is shown the cross-point switch 201 illustrated in FIG. 2 in further detail, in accordance with another embodiment of the present invention. The cross-point illustrated in FIG. 6 includes a cross point matrix 600 having m rows and m columns. The structure of the cross point matrix 600 illustrated in FIG. 6 is similar to that of the cross point matrix 500 illustrated in FIG. 5, except that the cross point matrix 600 has a significantly greater capacity. To this end, the cross point matrix 600 is made up of a plurality ASICs, each of the ASICs $602_{i,j}$ able to connect the 128 port inputs to 128 port outputs.

The embodiment of FIG. 6 employs a plurality of cross point ASICs to allow for greater capacity than that which would be possible with a single cross point ASIC circuit. In particular, the practical commercial limitation for a single ASIC is 128×128 cross points. Although that number may be increased, the present invention provides for significantly greater relative capacity by allowing several of such ASICs in a single switch design. For example, even a 3×3 matrix of ASICs, each having 128×128 cross points, increases the switching capacity of the cross point matrix 600 by a factor of nine. The prior design of the physical layer switch matrix used individual cross point connections to each port via an address line. The use of such a configuration is impractical when large numbers of cross points are involved and/or multiple ASICs are involved.

Figure 7:
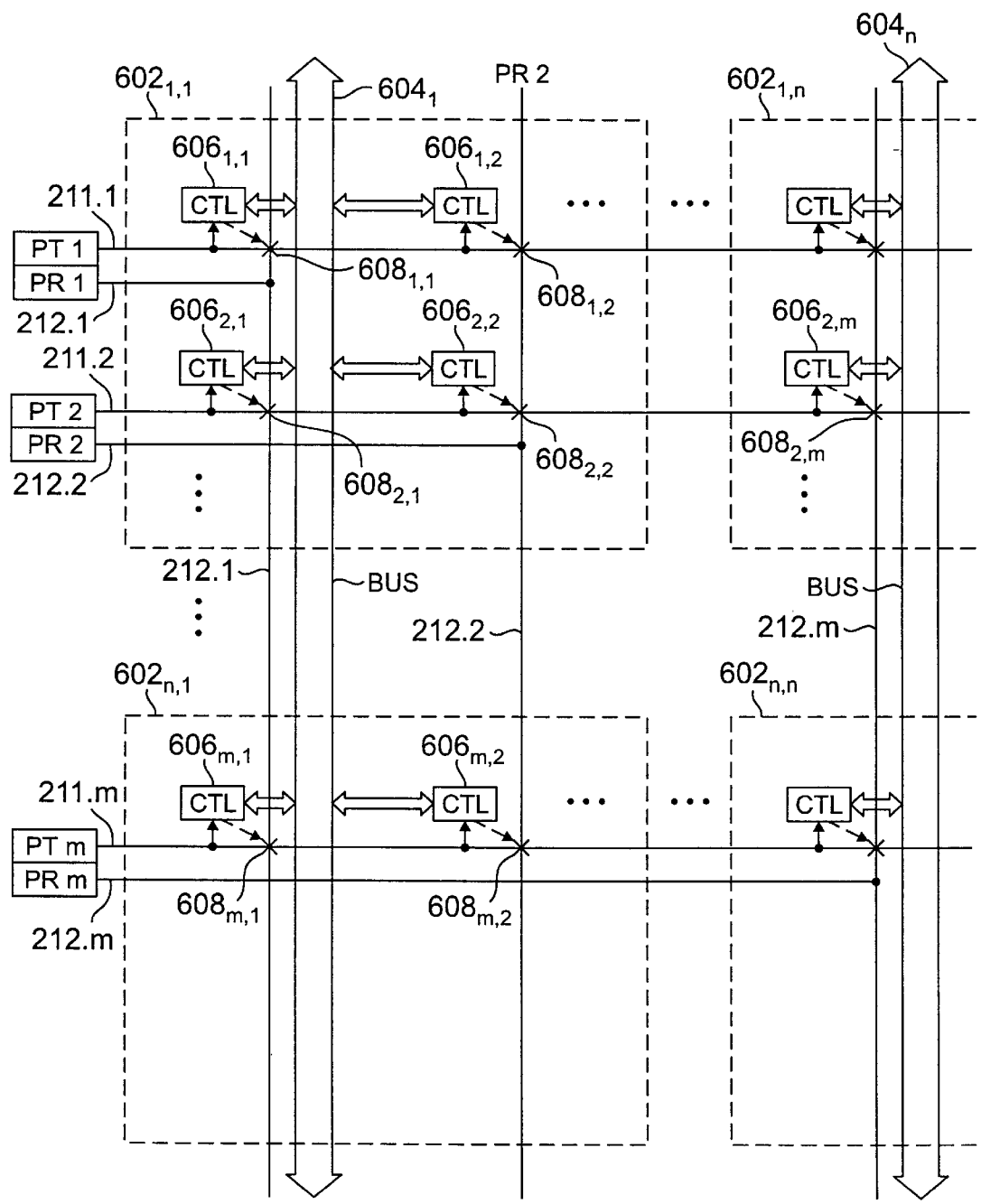
FIG. 7 shows further details of the control circuits in the cross point matrix illustrated in FIG. 6, in accordance with the present invention.

Referring to FIG. 7, there are shown further details of the cross point matrix 600 illustrated in FIG. 6, in accordance with the present invention. In particular, shown specifically in FIG. 7 are portions of four ASICs of the cross point matrix 600. In particular, portions of the ASIC $602_{1,1}$, ASIC $602_{1,n}$, ASIC $602_{n,1}$ and ASIC $602_{n,n}$ are shown. In describing the embodiment illustrated in FIG. 7, it is assumed that each ASIC has 128 input ports and 128 output ports.

As discussed above in connection with FIG. 6, each ASIC $602_{i,j}$ is operable to switch multiple ports, for example 128 ports. To illustrate this multi-port switching capability, the ASIC $602_{1,1}$, is shown in part in FIG. 7. In particular, FIG. 7 shows two exemplary rows and two exemplary columns of cross points $608_{1,1}$, $608_{1,2}$, $608_{2,1}$ and $602_{2,2}$ of the ASIC $602_{1,1}$. The two rows and columns facilitate switching among two ports within the ASIC $602_{1,1}$, as well as among the ports coupled to the other ASICs. It will be appreciated that the ASIC $602_{1,1}$ includes sufficient cross points to switch 128 ports.

FIG. 7 also shows portions of ASICs $602_{n,1}$, ASIC $602_{1,n}$ and ASIC $602_{n,n}$ in order to illustrate an exemplary connection of a port i=2 to a port j=m. In such an example, it is noted that m is equal to (n−1)*128 plus some value between 1 and 128 because it is located in the nth ASIC.

As illustrated in FIG. 7, each cross point $608_{i,j}$ within the cross point matrix 600 has a corresponding control circuit $606_{i,j}$. Each cross point $608_{i,j}$ controllably connects a port transmit line 211.i to a port receive line 212.j to effect a cross point connection. Each control circuit $606_{i,j}$ is coupled to a corresponding port transmit line 211.i and is further coupled to communicate on a column bus $604_x$ that corresponds to the $ASIC_{d,x}$ where d is a don't-care value and x defines the ASIC column in which the control circuit $606_{i,j}$ is located. The ASIC column x may be thought of as a function of the cross point column j. For example, in cross point matrix that employs 128×128 cross point ASICs, the value of x may suitably be given by:

$$x = \text{Int}(1 + j/128),$$

where Int(value) is a truncating integer function. Thus, for a cross point $608_{700, 200}$, its corresponding control circuit $606_{700, 200}$, is coupled to the column control bus $604_2$.

Exemplary operation of the portion of the cross point matrix 600 of FIG. 7 is provided through a discussion of a proposed connection between port 2 and port m, with port 2 being the source port and port m being the destination port. First, the source address and destination address are provided to the port transmit line 211.2 by the front end interface 202.2, not shown in FIG. 7. Each of the control circuits $606_{2,1}$, $606_{2,2}$, and $606_{2,m}$ receives the source and destination address information. However, only the control circuit or circuits within the ASIC in the xth column use the address information in the first portion of the connection operation. Using the above equation, x=Int. (1+i/128), and thus x=1. Thus, only the control circuits in the $ASIC_{1,1}$ connected to the port transmit line 211.2 use the information. Accordingly, either the control circuit $606_{2,1}$ or $606_{2,2}$ of the ASIC $602_{1,1}$ uses the information. In the exemplary embodiment described herein, the control circuit 606 that is located in the ith cross point column, i.e., the control circuit $606_{i,i}$, uses the address information. Thus, in this example, the control circuit $606_{2,2}$ uses the information because the control circuit $606_{2,2}$ matches its j value (2) with the source port i value (2). No other control circuits need to obtain the information.

The control circuit $606_{2,2}$ provides the source and destination address on the control bus $604_1$. All of the control circuits on the control bus $604_1$ receive the information. However, only one control circuit acts on the information. The control circuit that acts on the transmitted information is the control circuit that has a source value i that corresponds to the transmitted destination address information j and a destination value j that corresponds to the transmitted source address information i. Accordingly, the exemplary operation described herein, the control circuit $606_{m,2}$ obtains the address information. The control circuit $606_{m,2}$ obtains the information and causes its associated cross point $608_{m,2}$ to be connected. This sets up the return path from transmit line 211.m to receive line 212.2 for collision monitoring.

If no collision is detected by the front end interface 202.2 of the source port, then the front end interface 202.2 again transmits the source and destination address information to all the control circuits coupled to the port transmit line 211.2. Now, the control circuit $606_{2,m}$, receives the source and destination address information and is the only control circuit to act on it. The control circuit $606_{2,m}$ causes its associated cross point $608_{2,m}$ to be connected to set up the transmission path from the port transmit line 211.2 to the port receive line 212.m to $PR_m$.

Figure 8:
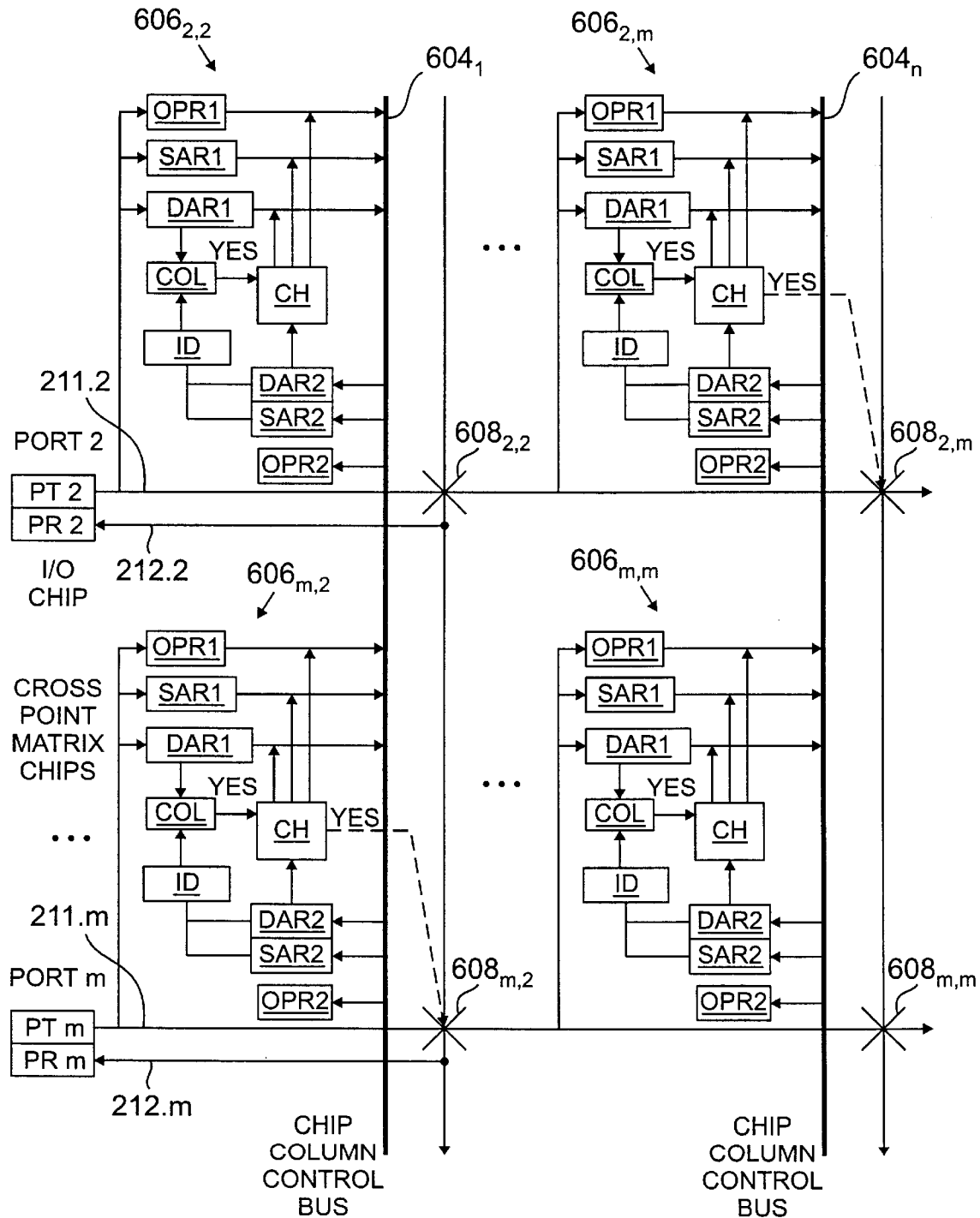
FIG. 8 shows further details of the control circuits in the cross point matrix as illustrated in FIG. 7, in accordance with the present invention.
Figure 9A:
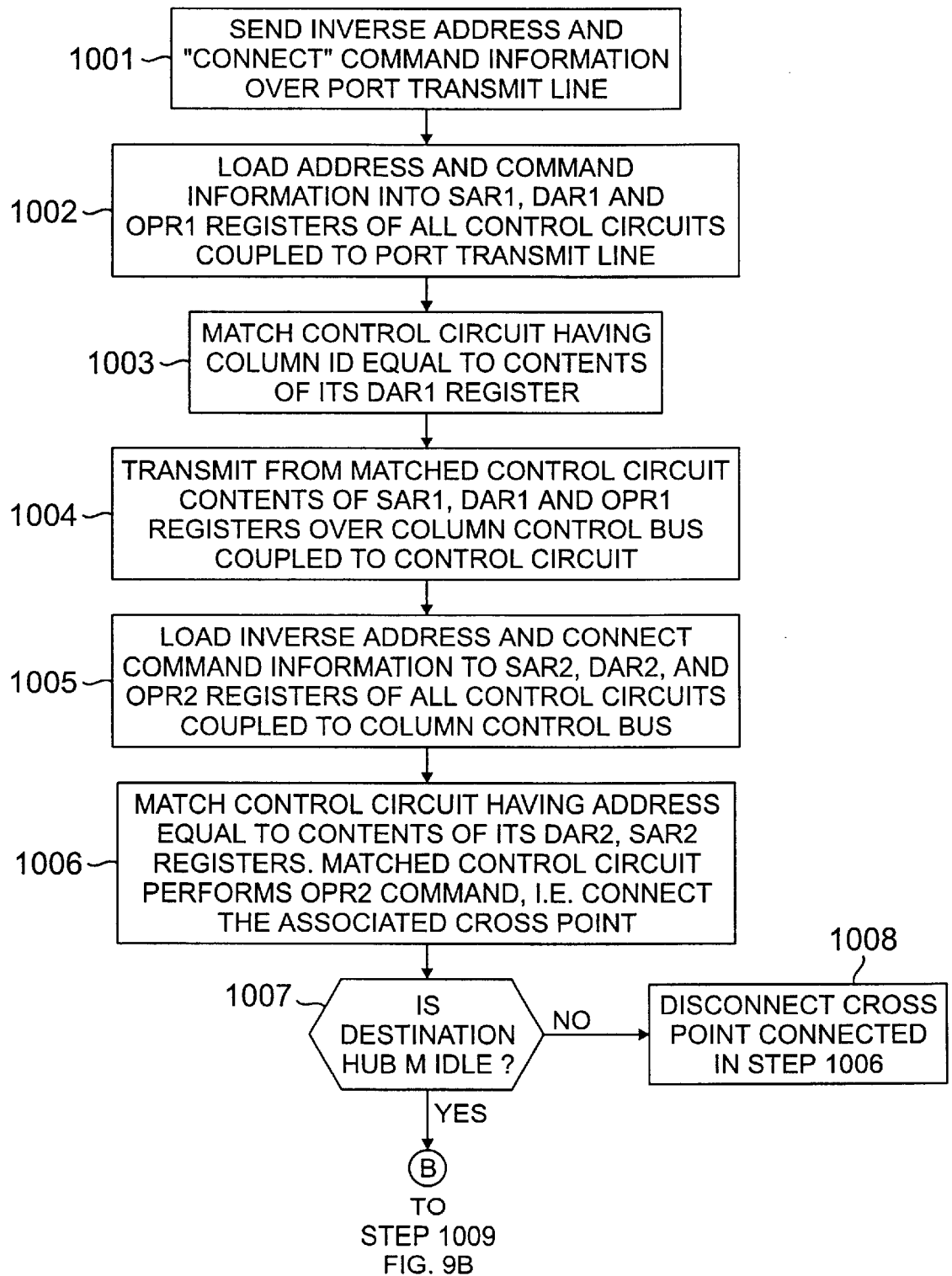
FIGS. 9A–D is a flowchart illustrating a process of transmitting a packet in reference to the structure illustrated in FIGS. 1, 2, 6, 7 and 8, in accordance with the present invention.
Figure 9B:
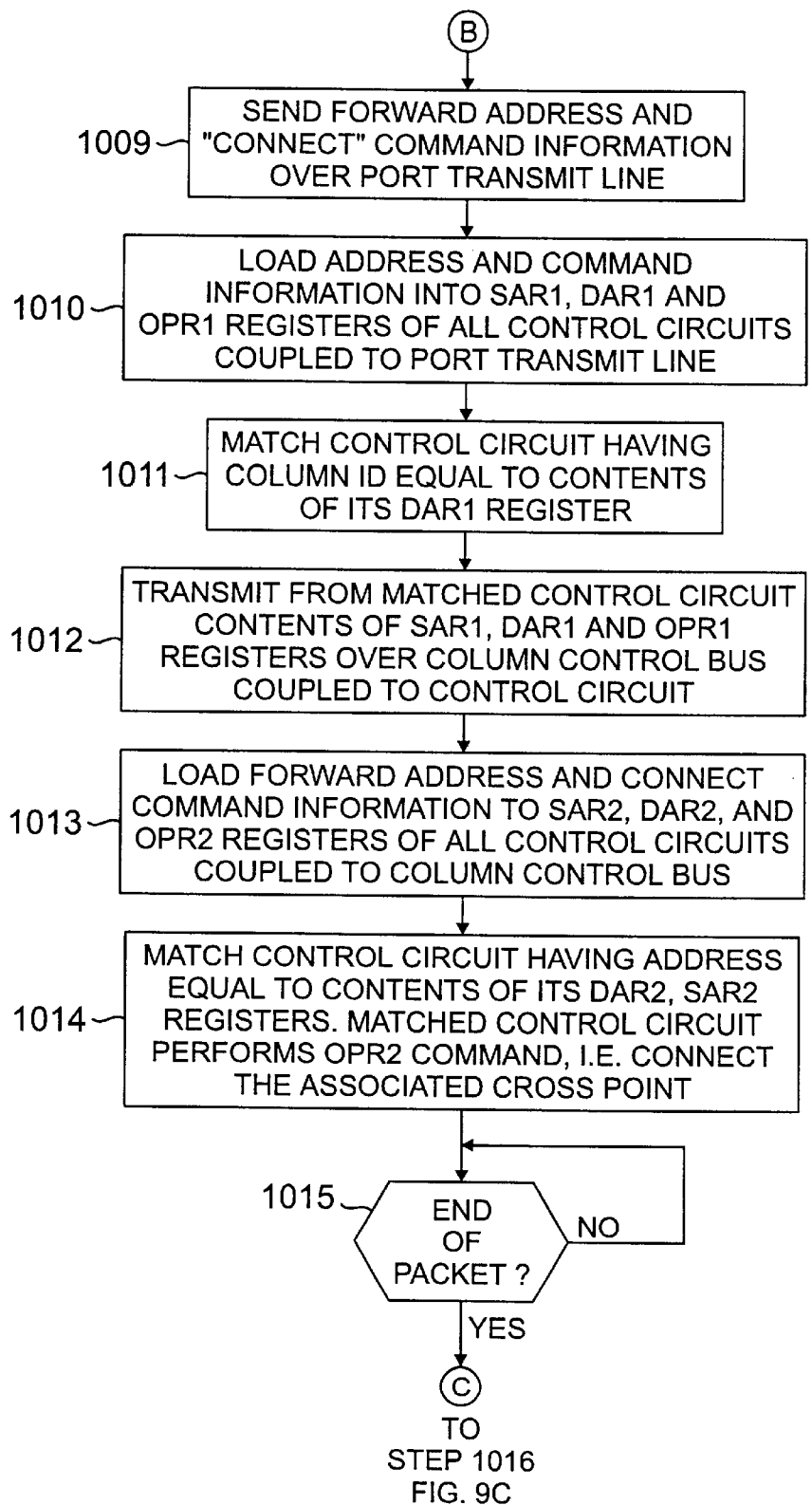
Figure 9C:
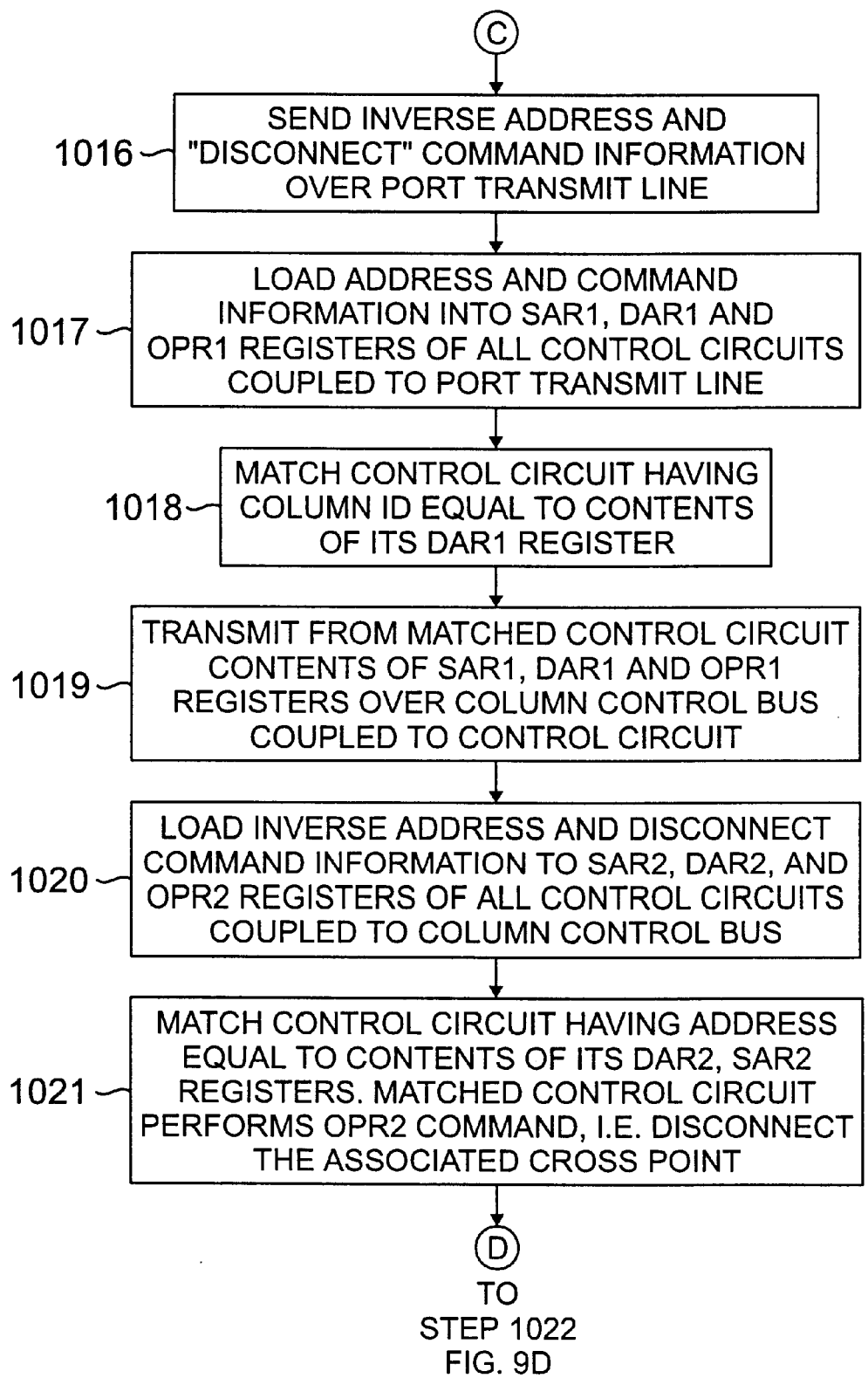
Figure 9D:
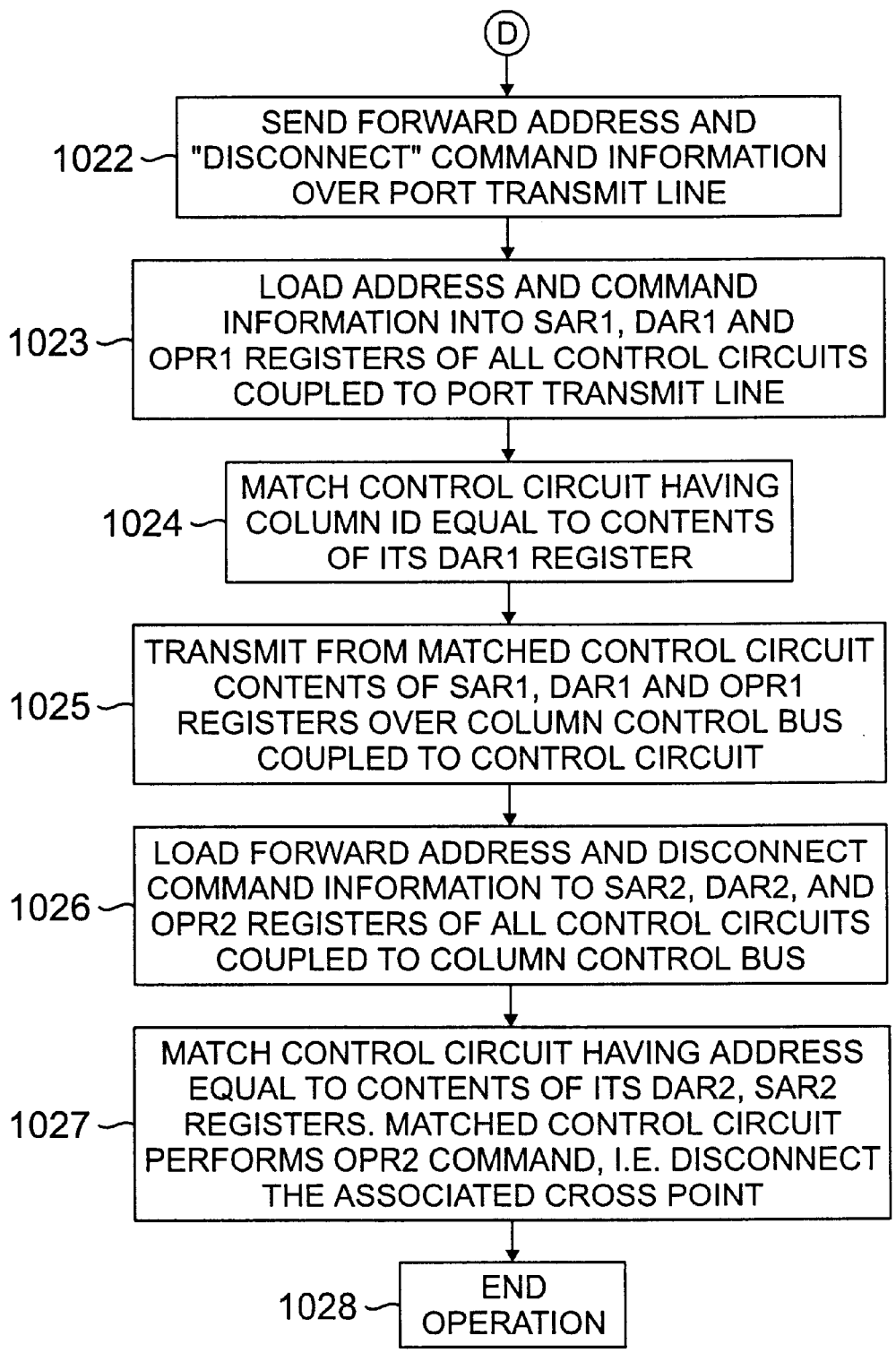

Referring to FIG. 8, there are shown further details of the structure of some of the control circuits in the cross point matrix 600 illustrated in FIGS. 6 and 7, in accordance with the present invention. Specifically, FIG. 8 shows two column control buses $604_1$ and $604_n$, and control circuits $606_{2,2}$ and $606_{2,m}$ from the port transmit line 211.2 associated with port 2, and control circuits $606_{m,2}$ and $606_{m,m}$ from the port transmit line 211.m associated with port m. FIG. 8 further shows the associated cross points $608_{2,2}$, $608_{2,m}$, $608_{m,2}$, and $608_{m,m}$. Each of the switch cross points $608_{i,j}$ is controlled to be switched-on or switched-off by its respective control circuit $606_{i,j}$. As discussed above in connection with FIG. 7, the column control bus $604_1$ is coupled to all control circuits within the first column of chips that includes ASICs $602_{1,1}$ and $602_{n,1}$. The column control bus $604_n$ is coupled to all control circuits in the nth column of chips that includes ASICs $602_{1,n}$ and $602_{n,n}$. In FIG. 8, the matrix includes two port transmit lines 211.2 and 211.m and two port receive lines 212.2 and 212.m. As discussed above, the port transmit and port receive lines are arranged such that a unilateral path can be established, via selected switch cross point(s), from any port transmit line to any port receive line.

Each control circuit $606_{i,j}$ includes a first SA register SAR1, a first DA register DAR1, a second SA register SAR2, a second DA register DAR2, a first operation register OPR1, a second operation register OPR2, a control block CH, a column match detector COL, and an identification block ID. The first SA register SAR1 and the first DA register DAR1 are operably coupled to receive address information from the respective port transmit line 211.i and to provide information, under control of the control block CH, to the bus $604_x$ where x is defined by column of the ASIC $602_{d,x}$ in which the control circuit $606_{1,j}$ is located. The operation register OPR1 is operable to receive an operation command from the port transmit line 211.i and provide that operation command to the bus 604x under the control of the control block CH. The second SA register SAR2 and the second DA register DAR2 are operably coupled to receive address information from the control bus $604_x$. The column match detector COL is operably coupled to receive the DAR1 information and is operable to determine whether the DAR1 information matches the column j in which the control circuit $606_{1,j}$ is located. To this end the column match detector COL obtains column information from the identification block ID.

The control block CH is operable to cause the registers SAR1, DAR1 and OPR1 to transmit their information on the bus $604_x$. The control block CH is further operable to perform an operation contained the second operation register OPR2 if the SAR2 and DAR2 registers contain the addresses corresponding to the cross point $608_{i,j}$. That operation may include connecting or disconnecting the cross point $608_{i,j}$. The control block CH also performs the exclusive-or function between the registers SAR1, DAR1, OPR1 and the registers SAR2, DAR2, OPR2 to carry out the datakit arbitration operation.

Referring to FIGS. 9A, 9B, 9C and 9D, there is shown a flowchart illustrating the process of transmitting a packet from a source port 2 (or source address) to a destination Hub that is coupled to a destination port m, in reference to the structure illustrated in FIGS. 1, 2, 6, 7 and 8, in accordance with the present invention.

It should be noted that because each of the ASICs in the matrix 600 illustrated in FIGS. 6, 7 and 8 includes 128×128 cross points and 128×128 corresponding control circuits, the source and destination addresses can also be represented in reference the positions of the ASICs in the matrix. Specifically, the source and destination addresses can be transformed into ASIC row and column positions in the matrix and the port positions within the ASIC rows and columns according to the following equations:

$ASIC$ row=Int(1+(source address)/128)       1.

Row position within the $ASIC$ row=the residual of ((source address)/128)       2.

$ASIC$ column=Int(1+(destination address)/128)       3.

Column position within the $ASIC$ column=the residual of ((destination address)/128)       4.

Thus, according to the above-described equations 1–4, when source address is 2 and destination address is m; the ASIC row is equal to 1, the row position within the ASIC row is equal to 2, the ASIC column, x, is equal to Int(m/128+1), and the column position within the ASIC column is equal residual of (m/128).

In step 1001, the front end interface 202.2 sends to port transmit line 211.2 inverted address information in order to set up the unilateral reverse communication path from port m to port 2. To this end, the front end interface 202.2 sends the address information SA=m and DA=2. The front end interface 202.2 also sends the operation command CONNECT on the port transmit line 211.2.

At step 1002, each control circuit $606_{2,d}$ in the second row loads its register DAR1 with the DA=2 and loads its SAR1 register with SA=m. Each control circuit $606_{2,j}$ also loads its OPR1 register with CONNECT.

At step 1003, the column match detector COL of each control circuit $606_{2,j}$ in the second row determines whether the value stored in the DAR1 register matches the column j in which the control circuit $606_{2,j}$ sits. If so, then in step 1004 the control block CH of that control circuit $606_{2,j}$ causes the registers DAR1, SAR1, and OPR1 to transmit their information over the control bus $604_x$ that is connected to the ASIC $602_{1,x}$ in which it is located. If not, however, then the control block CH for that control circuit does nothing with the data.

In the exemplary connection operation described herein, DA=2. As a result, only the control circuit $608_{2,2}$ causes the contents its SAR1, DAR1, and OPR1 registers, SA=m, DA=2, CONNECT, respectively, to be transmitted on the control bus $604_1$. To this end, the control circuit $608_{2,2}$ employs the datakit arbitration scheme as discussed further above.

In step 1005, all of the control circuits $606_{x,y}$ that are coupled to the column control bus $604_1$ receive the information SA=m, DA=2, CONNECT into their registers SAR2, DAR2, and OPR2 respectively. In the exemplary embodiment described herein, the control circuits $606_{x,y}$ connected to the column control bus $604_1$ include all of the control circuits $606_{x,y}$ located within the ASICs of the first column of ASICs $602_{z,1}$ where z=1 to n. Thus, the x is equal to all values from 1 to 128*n, and y is equal to all values from 1 to 128.

In step 1006, only the control circuit $606_{x,y}$ that matches the SA, DA information acts upon the information. To this end, only the control circuit $606_{m,2}$ acts upon the SA=m, DA=2, and CONNECT information transmitted on the column control bus $604_1$. All other control circuits $606_{x,y}$ connected to the bus $604_1$ ignore the information. The control circuit $606_{m,2}$ acts on the information by performing the operation information received by its OPR2 register. In other words, the control circuit $606_{m,2}$ causes the cross point $608_{m,2}$ to be connected.

Once the cross point $608_{m,2}$ is connected, the front end interface 202.2 can monitor the port m because the port transmit line 211.m is unilaterally connected to the port receive line 212.2. To this end, at step 1007, the front end interface 202.2 determines whether the destination Hub m is idle by monitoring traffic on the port transmit line 211.m. If the destination Hub m is idle, the operation proceeds to step 1009; if the destination Hub is not idle, the operation proceeds to step 1008.

In step 1008, (Hub m determined to be not idle) the front end interface 202.2 causes the control circuit $606_{m,2}$ to disconnect as a result of the detected busy status of Hub m. To this end, steps 1001 through 1005 may be repeated to communicate the DISCONNECT command to the control circuit $606_{m,2}$, except that, of course, a DISCONNECT command is transmitted instead of a CONNECT command. Once the control circuit $606_{m,2}$ receives the SA=m, DA=2, and DISCONNECT information into its registers SAR2, DAR2, and OPR2, respectively, it causes the cross point $608_{m,2}$ to be disconnected.

In step 1009, (Hub m determined to be idle), the front end interface 202.2 sends over the port transmit row 211.2 the forward path address information SA=2, DA=m, as well as the operation command CONNECT. In step 1010, all of the control ports $606_{2,j}$ in the second row receive the information and stores SA=2, DA=m and CONNECT in their SAR1, DAR1 and OPR1 registers, respectively At step 101 1, the column match detector COL of each control circuit $606_{2,j}$ in the second row determines whether the value stored in the DAR1 register matches the column j in which the control circuit $606_{2,j}$ sits. If so, then in step 1012 the control block CH of that control circuit $606_{2,j}$ causes the registers DAR1, SAR1, and OPR1 to transmit their information over the control bus $604_x$ that is connected to the ASIC $602_{1,x}$ in which it is located. If not, however, then the control block CH for that control circuit does nothing with the data.

In the exemplary connection operation described herein, DA=m. As a result, only the control circuit $606_{2,m}$ cause the contents its SAR1, DAR1, and OPR1 registers, SA=2,DA=m, CONNECT, respectively to be transmitted on its associated control bus $604_n$. To this end, the control circuit $608_{2,m}$ employs the datakit arbitration scheme as discussed further above.

In step 1013, all of the control circuits $606_{f,g}$ that are coupled to the column control bus $604_n$ receive the information SA=2, DA=m, CONNECT into their registers SAR2, DAR2, and OPR2 respectively. In the exemplary embodiment described herein, the control circuits $606_{f,g}$ connected to the column control bus $604_n$ include all of the control circuits $606_{f,g}$ located within the nth column of ASICs $602_{z,n}$ where z=1 to n. Thus, f is equal to all values from 1 to 128*n, and g is equal to all values from (n-1)*128 to n*128.

In step 1014, only the control circuit $606_{f,g}$ that matches the SA, DA information acts upon the information. To this end, only the control circuit $606_{2,m}$ acts upon the SA=2, DA=m, and CONNECT information transmitted on the column control bus $604_n$. In other words, the same control circuit that transmitted the information or the column control bus $604_n$ also acts upon the information. All other control circuits $606_{x,y}$ connected to the bus $604_n$ ignore the information. The control circuit $606_{2,m}$ acts on the information by performing the operation received into its OPR2 register. In other words, the control circuit $606_{2,m}$ causes the cross point $608_{2,m}$ to be connected. Once the cross point $608_{2,m}$ is connected, the packet originating from port 2 may now be transmitted to port m. Meanwhile, the front end interface 202.2 continues to monitor the reverse path connection for collision.

It will be noted that in steps 1012 through 1014, data is transmitted by the control circuit $606_{2,m}$ on the bus $604_n$, which is then received only by control circuit $606_{2,m}$. Those steps should always produce a similar result because the unilateral forward path connection from port i to port j will always involve the control circuit connected to the ith port transmit row 211.i. Thus, actual transmission of the address and control information on the column control bus $604_n$ in steps 1012 and 1013 is not truly necessary. However, in the present embodiment, those steps are included to simplify the hardware requirements of the control circuits 606. In particular, the hardware of the control circuits 606 shown in FIG. 8 operates the same regardless of whether the reverse path or forward path connection is being set up. As a result, the control circuit hardware may be of relatively simple design.

In an alternative embodiment, the control circuit $606_{i,j}$ may be modified to eliminate steps 1012 and 1013. In particular, each control circuit may be modified to recognize when the SAR1 and DAR1 registers have the SA, DA values associated with its matrix location. In such an example, the control circuit $606_{2,m}$ would recognize when its registers SAR1 and DAR1 contain SA=2 and DA=m. Upon such recognition, the control circuit $606_{2,m}$ would then perform the operation in the register OPR1, such as CONNECT, instead of transmitting that information to the registers SAR2, DAR2, OPR2 of the same control circuit $606_{2,m}$ over the bus $604_n$.

In any event, the front end interface 202.2 in step 1015 monitors the transmission of the packet from the Hub 2 to the Hub m. When the end of the packet is detected, the operation proceeds to step 1016. In steps 1016–1021, the connections at cross points $608_{2,m}$ and $608_{m,2}$ are disconnected.

To release the unilateral path from the port transmit line 211.m to the port receive line 212.2, the front end interface 202.2 in step 1016 sends the following information over the port transmit line 211.2: SA=m, DA=2, and operation=DISCONNECT. As with step 1002, in step 1017, every control circuit $606_{2,j}$ in the second row loads the information in its corresponding registers SAR1, DAR1, and OPR1.

Similar to steps 1003 and 1011, in step 1018, the column match detector COL of each control circuit $606_{2,j}$ in the second row determines whether the value stored in the DAR1 register matches the column j in which the control circuit $606_{2,j}$ sits. If so, then in step 1019 the control block CH of that control circuit $606_{2,2}$ causes the registers DAR1, SAR1, and OPR1 to transmit their information over the control bus $604_x$ that is connected to the ASIC $602_{1,x}$ in which it is located. Thus, in the exemplary operation described herein, the control circuit $606_{2,2}$ causes its registers SAR1, DAR1, OPR1 to transmit their contents over the column control bus $604_1$.

In step 1020, all of the control circuits $606_{x,y}$ that are coupled to the column control bus $604_1$ receive the information SA=m, DA=2, DISCONNECT into their registers SAR2, DAR2, and OPR2 respectively. As with step 1006 discussed above, in the exemplary embodiment described herein, the control circuits $606_{x,y}$ connected to the column control bus $604_1$ include all of the control circuits $606_{x,y}$ located within the first column of ASICs $602_{z,1}$ where z=1 to n.

In step 1021, only the control circuit $606_{x,y}$ that matches the SA, DA information acts upon the information. To this end, only the control circuit $606_{m,2}$ acts upon the SA=m, DA=2, and DISCONNECT information transmitted on the column control bus $604_1$. All other control circuits $606_{x,y}$ connected to the bus $604_1$ ignore the information. The control circuit $606_{m,2}$ acts on the information by performing the operation received into its OPR2 register. In other words, the control circuit $606_{m,2}$ causes the cross point $608_{m,2}$ to be disconnected.

The cross point $608_{2,m}$ must also be disconnected. To disconnect the cross point $608_{2,m}$, in step 1022, the front end interface 202.2 sends over the port transmit row 211.2 the forward path address information SA=2, DA=m, as well as operation=DISCONNECT. In step 1023, all of the control ports $606_{2,j}$ in the second row receive the information and stores SA=2, DA=m and DISCONNECT in their SAR1, DAR1 and OPR1 registers, respectively At step 1024, the column match detector COL of each control circuit $606_{2,j}$ in the second row determines whether the value stored in the DAR1 register matches the column j in which the control circuit $606_{2,j}$ sits. If so, then in step 1025 the control block CH of that control circuit $606_{2,m}$ causes the registers DAR1, SAR1, and OPR1 to transmit their information over the control bus $604_x$ that is connected to the ASIC $602_{1,x}$ in which it is located. If not, however, then the control block CH for that control circuit does nothing with the data.

Thus, in the exemplary connection operation described herein, only the control circuit $608_{2,m}$ would cause the contents its SAR1, DAR1, and OPR1 registers, SA=2, DA=m, operation=DISCONNECT, respectively to be transmitted on the control bus $604_n$.

Similar to step 1013, in step 1026, all of the control circuits $606_{f,g}$ that are coupled to the column control bus $604_n$ receive the information SA=2, DA=m, DISCONNECT into their registers SAR2, DAR2, and OPR2 respectively.

In step 1027, only the control circuit $606_{f,g}$ that matches the SA, DA information acts upon the information. To this end, only the control circuit $606_{2,m}$ acts upon the SA=2, DA=m, and DISCONNECT information transmitted on the column control bus $604_n$. All other control circuits $606_{f,g}$ connected to the bus $604_n$ ignore the information. The control circuit $606_{2,m}$ acts on the information by performing the operation received into its OPR2 register. In other words, the control circuit $606_{2,m}$ causes the cross point $608_{2,m}$ to be disconnected.

After both cross points $608_{2,m}$ and $608_{m,2}$ are released, the operation is led back to step 1028 to end the operation.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

We claim:

1. In using with a switching system having m ports with each of the ports being coupled to a local area network via a Hub, the connectivity between the inputs and outputs of the m ports forming a matrix of cross points having m rows and m columns, each port having a transmit line being coupled to a row of the matrix and a receive line being coupled to a column of the matrix, a transmission operation from a source port (i) to a destination port (j) involving a first control circuit for unilaterally connecting the port (i) to the port (j) and a second control circuit for unilaterally connecting the port (j) to the port (i), a method for communicating from the source port (i) to the destination port (j) comprising the steps of:

a) sending address information from the port (i) to a third control circuit;

b) providing a column control bus that couples the third control circuit to a plurality of control circuits including the second control circuit, each of the plurality of control circuits operable to control the operation of a cross point;

c) routing the address information from the third control circuit to all of the plurality of control circuits including the second control circuit through the column control bus; and d) responsive to receiving the address information at the second control circuit, making a unilateral path connection at a return path cross point from the destination port 6) to the source port (i).

2. The method of claim 1 wherein step b) further comprises providing the column control bus that couples the third control circuit to the plurality of control circuits including the second control circuit, such that each of the plurality of control circuits is operable to control the operation of a cross point located in a predetermined number of columns in the matrix including the ith column.

3. The method of claim 2 wherein the predetermined number of columns includes all of the m columns of one of a plurality of cross point integrated circuits in the matrix.

4. The method of claim 1 wherein step b) further comprises providing the column control bus that couples the third control circuit to the plurality of control circuits including the second control circuit, such that each of the plurality of control circuits is operable to control the operation of a cross point located in the ith column.

5. The method of claim 1, wherein the destination port (j) is coupled to a Hub (J), the method further comprising the step of:

detecting, via the unilateral return path connection from the port (j) to the port (i), whether the Hub (j) is idle; and making a unilateral forward path connection, by the first control circuit, from the port (i) to the port (j) when the Hub (j) is idle.

6. The method of claim 5, further comprising the step of:

transmitting a packet to the Hub (j) via the unilateral forward path connection from the source port (i) to the destination port (j), when the Hub (j) is idle.

7. The method of claim 5, wherein the address information is contained in a packet that is intended to be transmitted from the transmission source port (i) to the transmission destination port (j).

8. The method of claim 5, further comprising the steps of:

providing a register that is coupled to the first control circuit for storing the source address and destination address in the address information for the first control circuit; and providing a column control bus controller that is coupled to the second control circuit for monitoring the source address and destination address stored in the second control circuit.

9. The method of claim 1, wherein the destination port (j) is coupled to a Hub (j), the method further comprising the steps of:

detecting, via the unilateral return path connection from the port (j) to the port (i), whether the Hub (j) is idle;

generating collision information when the Hub (j) is not idle; and making a unilateral forward path connection, by the first control circuit, from the port (i) to the port (j) when the Hub (j) is idle.

10. In using with a switching system having m ports with each of the ports being coupled to a local area network via a Hub, the connectivity between the inputs and outputs of the m ports forming a matrix of cross points having m rows and m columns, each port having a transmit line being coupled to a row of the matrix and a receive line being coupled to a column of the matrix, a transmission operation from a source port (i) to a destination port (j) involving a first control circuit for unilaterally connecting the port (i) to the port (i) and a second control circuit for unilaterally connecting the port (j) to the port (i), an apparatus for communicating from the source port (i) to the destination port (j) comprising:

a) means for sending address information from the port (i) to a third control circuit;

b) a column control bus coupling the third control circuit to a plurality of control circuits including the second control circuit, each of the plurality of control circuits operable to control the operation of a cross point, the column control bus operable to route the address information from the third control circuit to all of the plurality of control circuits including the second control circuit through the column control bus; and c) means for making a unilateral path connection at a return path cross point from the destination port (j) to the source port (i) responsive to receiving the address information at the second control circuit.

11. The apparatus of claim 10 wherein:

the column control bus couples the third control circuit to the plurality of control circuits including the second control circuit, such that each of the plurality of control circuits is operable to control the operation of a cross point located in a predetermined number of columns in the matrix including the ith column.

12. The apparatus of claim 11, wherein the predetermined number of columns includes all of the m columns of one of a plurality of cross point integrated circuits in the matrix.

13. The apparatus of claim 10, wherein the column control bus couples the third control circuit to the plurality of control circuits including the second control circuit, such that each of the plurality of control circuits is operable to control the operation of a cross point located in the ith column.

14. The apparatus of claim 10, wherein the destination port (j) is coupled to a Hub (j), the apparatus further comprising:

means for detecting, via the unilateral return path connection from the port (j) to the port (i), whether the Hub (j) is idle;

means for generating collision information when the Hub (j) is not idle; and means for making a unilateral forward path connection, by the first control circuit, from the port (i) to the port (j) when the Hub (j) is idle.

15. The apparatus of claim 14, further comprising:

means for transmitting a packet to the Hub (j) via the unilateral forward path connection from the source port (i) to the destination port (j), when the Hub (j) is idle.

16. The apparatus of claim 14, wherein the address information is contained in a packet that is intended to be transmitted from the transmission source port (i) to the transmission destination port (j).

17. The apparatus of claim 16, further comprising:

a register that is coupled to the first control circuit for storing the source address and destination address in the address information for the first control circuit; and a bus controller that is coupled to the second control circuit for monitoring the source address and destination address stored in the second control circuit.

18. In using with a switching system having m ports with each of the ports being coupled to a local area network via a Flub, the connectivity between the inputs and outputs of the m ports forming a matrix of cross points having m rows and m columns, each port having a transmit line being coupled to a row of the matrix and a receive line being coupled to a column of the matrix, an apparatus for communicating from the source port (i) to the destination port (j) comprising:

a) a first control circuit operable to cause a first cross point to unilaterally connect a source port (i) to a destination port (j);

b) a second control circuit operable to cause a second cross point to unilaterally connect a destination port (j) to a source port (i);

c) a third control circuit is further operable to receive address information from the port (i);

d) a column control bus that couples the third control circuit to a plurality of control circuits including the second control circuit, each of the plurality of control circuits operable to control the operation of a cross point, the column control bus operable to route the address information from the third control circuit to all of the plurality of control circuits including the second control circuit; and wherein the second control circuit is operable to cause the second cross point to make a unilateral path connection at a return path cross point from the destination port (j) to the source port (i) responsive to receiving the address information on the column control bus.

19. The apparatus of claim 18 wherein each of the plurality of control circuits coupled to the column control bus is operable to control the operation of a cross point located in a predetermined number of columns in the matrix including the ith column.

20. The apparatus of claim 19, wherein the predetermined number of columns includes all of the m columns of one of a plurality of cross point integrated circuits in the matrix.

21. The apparatus of claim 18, wherein each of the plurality of control circuits coupled to the column control bus is operable to control the operation of a cross point located in the ith column.

22. The apparatus of claim 18, wherein the destination port (j) is coupled to a Hub (j), the apparatus further comprising:

a collision detector coupled to port (i) configured to detect, via the unilateral return path connection from the port (j) to the port (i), whether the Hub (j) is idle; and wherein first control circuit generates a unilateral forward path connection from the port (i) to the port (j) when the Hub (j) is idle.

23. The apparatus of claim 22 wherein the collision detector is coupled to a collision signal generator, the collision signal generator operable to transmit a collision signal to a Hub (i) when the Hub (j) is busy.

* * * * *